UNITED STATES PATENT OFFICE.

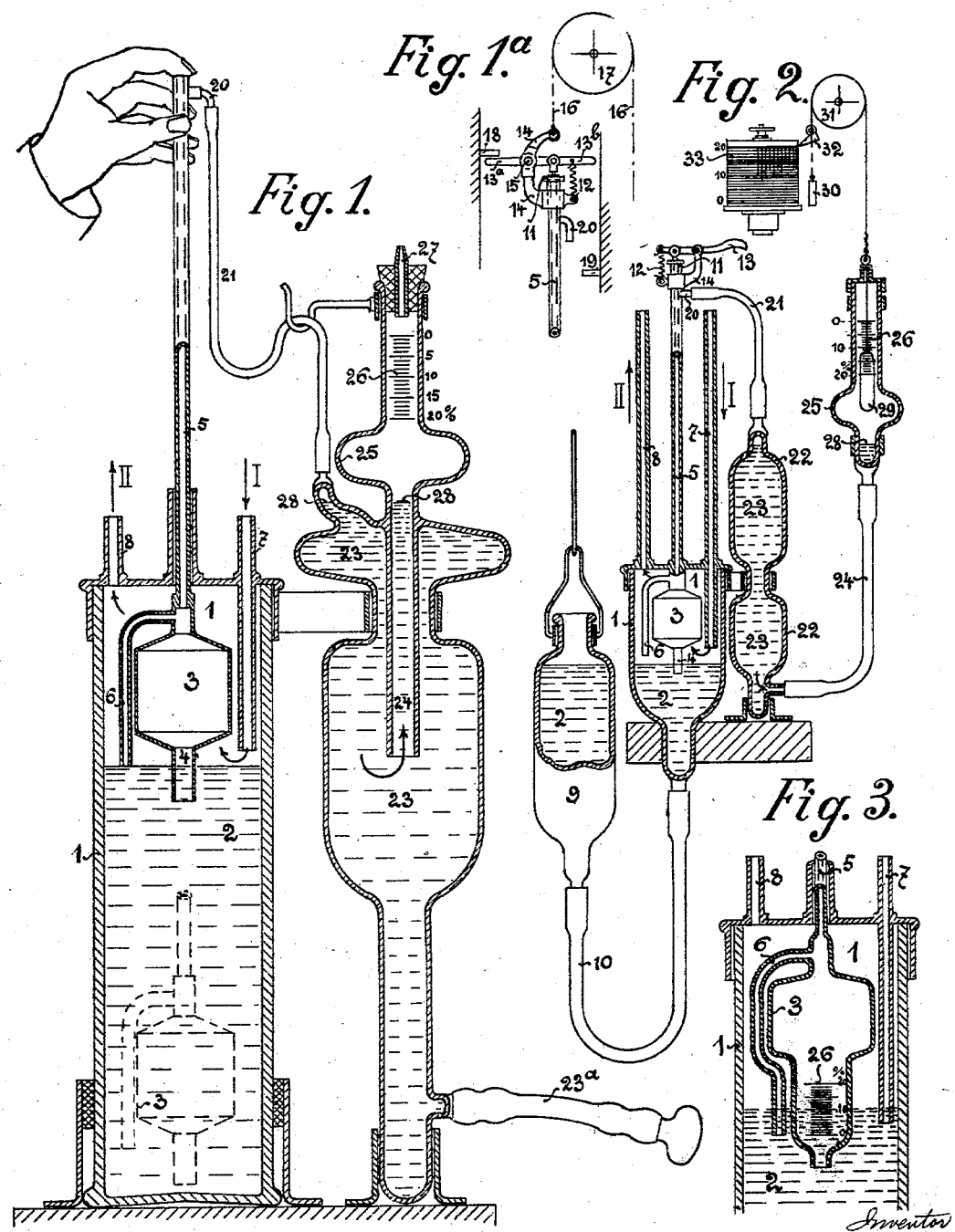

MAX ARNDT, OF AIX-LA-CHAPELLE, GERMANY.

GAS-ANALYSIS APPARATUS.

SPECIFICATION forming part of Letters Patent No. 717,654, dated January 6, 1903.

Application filed May 19, 1902. Serial No. 108,016. (No model.)

*To all whom it may concern:*

Be it known that I, MAX ARNDT, a subject of the King of Prussia, Emperor of Germany, residing at No. 35 Aureliusstrasse, in the city of Aix-la-Chapelle, Rhine Province, in the German Empire, have invented a new and useful Device for Transferring Samples of Gas to a Gas-Absorption Apparatus, of which the following is a specification.

My invention relates to a device for taking a sample of gas by suction from a gaseous mixture and conducting such sample to a gas-absorption apparatus.

My invention comprises, in combination, three principal pieces of apparatus—first, a dipping or sampling vessel having an aperture at the bottom and provided at the top with a narrow tube connecting with the absorption-space of a gas-absorption apparatus, as also with a tube descending toward the aperture, but terminating above the same; second, a receptacle containing a liquid for the purpose of making a seal and provided with an inlet and an outlet for the gaseous mixture, and, third, a gas-absorption apparatus.

In the annexed drawings, Figure 1 shows a vertical section of the entire apparatus. Fig. 1ª is a detail view showing in elevation and part section a device for mechanically moving the dipping vessel. Fig. 2 shows in vertical section and part elevation a modification of the complete apparatus in combination with a registering device. Fig. 3 is a detail view showing a vertical section of a modified construction of the dipping vessel.

Referring more particularly to Fig. 1 of the drawings, 1 is a receptacle containing the sealing liquid 2.

3 is the dipping vessel, having an inlet and outlet tube 4.

5 is a tube connected to the top of the vessel 3. 6 is a tube conducting from the top of the latter downward, but terminating above the level of the mouth of the tube 4.

7 is an inlet-tube for the gaseous mixture, and 8 is an outlet for the same.

The gas enters at 7 in the direction of the arrow I into the receptacle 1 and escapes at 8 in the direction of the arrow II.

20 is a bend connecting the tube 5 with a length of rubber tubing 21, conducting to the absorption vessel 22, containing the absorption liquid 23.

24 is a tube conducting to a vessel 25.

23ª is a flexible tube by means of which the liquid 23 may be run out of the vessel 22.

27 is a short tube by means of which the vessel 25 communicates with the atmosphere.

26 is a scale provided on the vessel 25 for reading off the analysis resulting through absorption, and 28 is a mark on the vessel 25.

The apparatus operates as follows: The gaseous mixture to be analyzed enters through the tube 7 into the receptacle 1 in the direction of the arrow I and leaves through the tube 8 in the direction of the arrow II. The dipping vessel 3 is now descended below the level of the liquid 2 to the dotted-line position, the tube 5 remaining open above. The liquid 2 will fill the vessel 3 and a portion of the tube 5. If now the latter is closed with the finger and the vessel 3 raised, this latter vessel will remain filled. At the same time, however, in consequence of the siphonic action of the column of liquid in the vessel 3, some of the absorption liquid in the vessel 22 will rise in the tubing 21, so that the level of this liquid 23 in the tube 24 will sink below the mark 28. Immediately, however, the bottom of the tube 6 stands above the level of the sealing liquid 2 the vessel 3 will empty itself through the tube 4, and the liquid 2 in running out will suck in gas from the receptacle 1 through the tube 6, so that the vessel 3 will become filled with the latter. At the same time atmospheric pressure will again have been established in the absorption vessel 22 and the liquid 23 returned to the normal level 28. If now the vessel 3 is somewhat sunk, it will at the moment in which the tube 6 again dips into the liquid 2 take up a certain volume of gas. If the vessel 3 is then immersed until it occupies the dotted-line position, the pressure will drive the sample of gas out of the vessel 3 through the pipe 5 and tubing 21 into the vessel 22, and the pressure of the gas thus expelled will further compress a portion of the liquid 23 through the tube 24 into the air-space in the vessel 25, in which the liquid 23 will ascend the less the larger the quantity of gas from the sample which is absorbed, so that the quantity of gas actually absorbed can be read off on the scale 26. If now, finally, the tube 5 is opened, the liquid 23 will return to the normal level 28, and the remaining gas in the vessel 22 will be driven out through the tube 27, so that the apparatus is again ready for a fresh analysis.

The dipping vessel 3 can be raised and lowered mechanically by means of the apparatus shown in Fig. 1ª. For the purpose in view the vessel 3 is secured by its tube 5 to one arm of a hinged device 14, to the other arm of which is attached a cord 16, passing over a pulley 17, whereby the vessel 3 is suspended. Pivoted to the bracket 14, at the point 15, is a double-armed lever $13^a$ $13^b$, the latter arm of which is provided with a valve 11, controlling the mouth of the tube 5. If in the ascent the lever-arm $13^a$ strikes a stop 18, or if in the descent the lever-arm $13^b$ contacts with a stop 19, the valve 11 will be opened. In the intermediate positions of the lever $13^a$ $13^b$ between the stops 18 19 the valve 11 is kept closed by a spring 12.

Fig. 2 shows an apparatus in which the vessel 3 is rigidly secured to the receptacle 1, and the inlet and outlet tubes 7 and 8, as also the tube 5, extended upward so far that the sealing liquid 2 cannot overflow from these tubes when the reservoir 9 is raised to its maximum height. The tube 5 is closed by the valve 11, maintained in closed condition by the spring 12 and capable of being opened by depression of the lever 13, pivoted to the arm 14. The vessel 25 is connected by the tubing 24 with the vessel 22. In the vessel 25 is arranged a float 29, counterbalanced by a weight 30, attached to a cord passing over a pulley 31. The cord also controls a pencil 32, marking the paper strip wrapped around the rotating drum 33. Immediately the float 29 is sufficiently buoyed up by the liquid 23 rising in the vessel 25 the pencil 32 will record the result of the analysis.

Fig. 3 shows a dipping vessel upon which the scale is marked directly. In this case the vessels 1 and 3 are made of glass, and the analyses are read off after the absorption directly the liquid 2 in the vessel 1 and in vessel 3 attains the same level, the valve 11 remaining closed.

Having thus described my invention, what I claim as new is—

In an apparatus for taking up samples of gas and transferring them to a gas-absorption device, the combination of a receptacle, partly filled with liquid, to receive the gaseous mixture; a sampling vessel contained in said receptacle, having an aperture at the bottom and a tube descending from the top and terminating above the level of said aperture; and a vessel filled with a gas-absorbing liquid, communicating with said sampling vessel; and means for indicating the change in volume through absorption, all substantially as described.

In testimony that I claim the foregoing as my invention I have signed my name in presence of two subscribing witnesses.

MAX ARNDT.

Witnesses:
JOHN B. ADAMS,
H. QUADFLIEG.